No. 790,547.

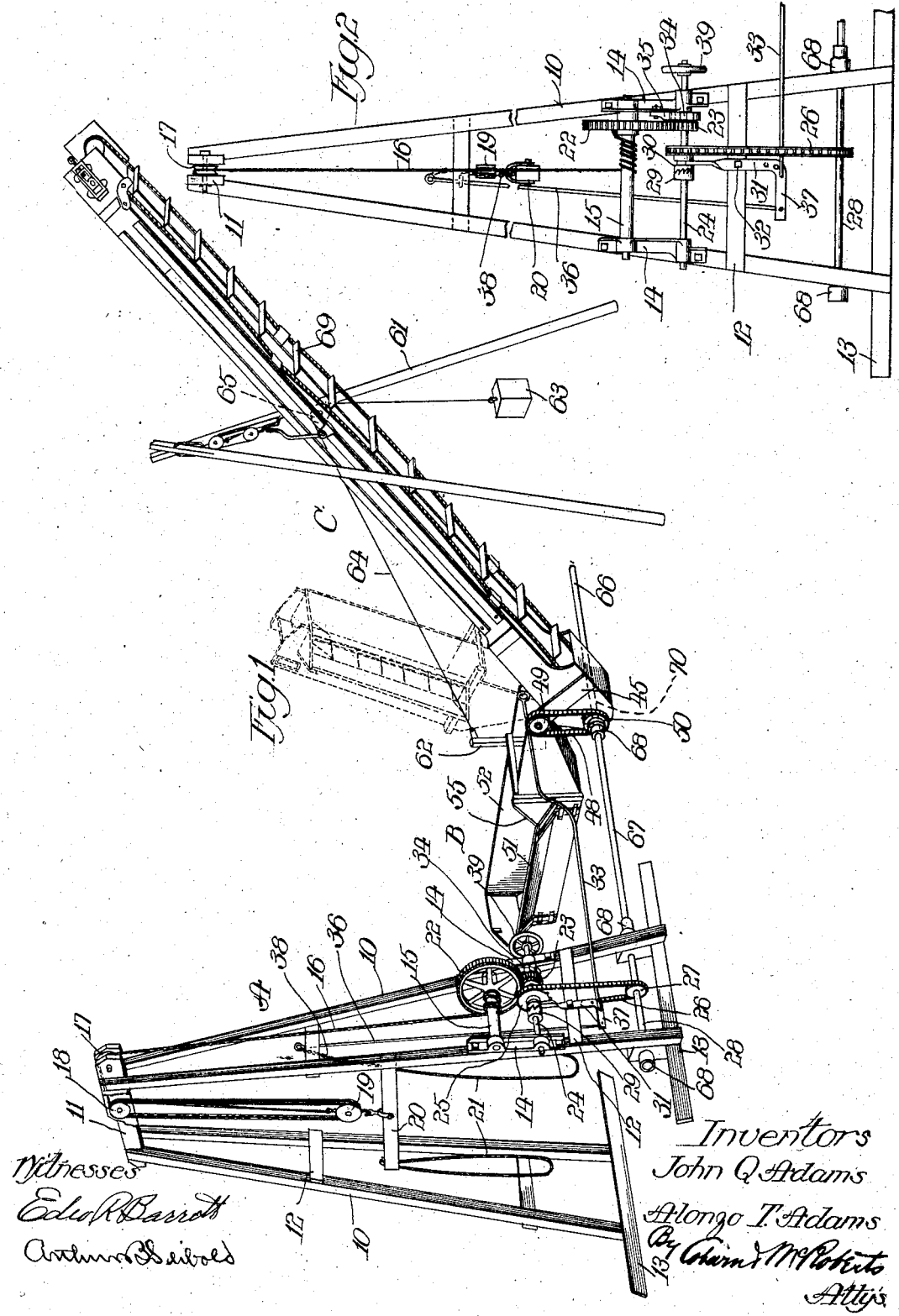

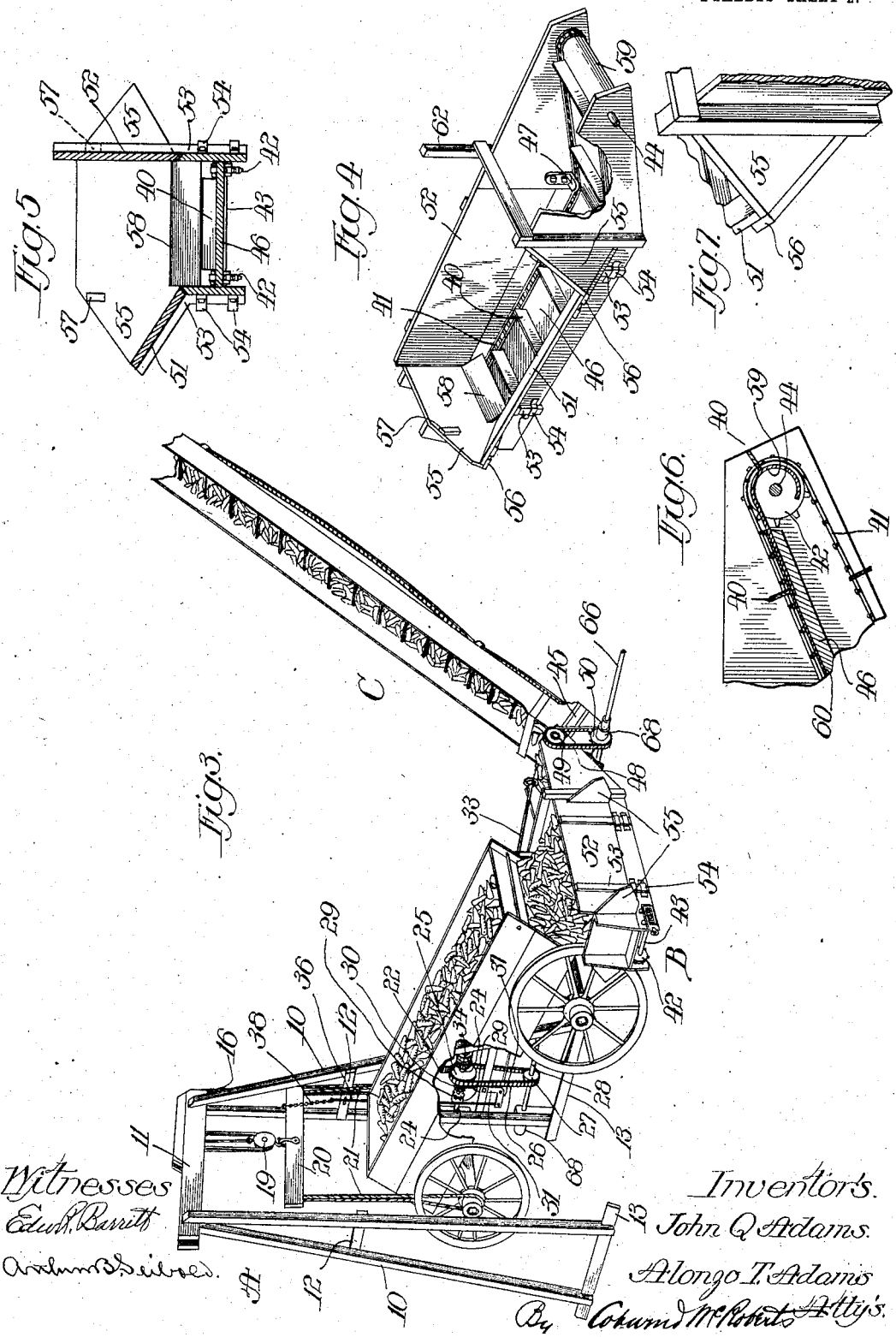

Patented May 23, 1905.

UNITED STATES PATENT OFFICE.

JOHN Q. ADAMS AND ALONZO T. ADAMS, OF MARSEILLES, ILLINOIS.

WAGON-DUMP AND ELEVATOR.

SPECIFICATION forming part of Letters Patent No. 790,547, dated May 23, 1905.

Application filed July 18, 1904. Serial No. 216,962.

*To all whom it may concern:*

Be it known that we, JOHN Q. ADAMS and ALONZO T. ADAMS, citizens of the United States, residing at Marseilles, in the county of Lasalle and State of Illinois, have invented certain new and useful Improvements in Wagon-Dumps and Elevators, of which the following is a specification.

Our invention relates to improvements in combined wagon-dumps and elevators of that character designed to transfer corn, wheat, or other grains, coal, or other substances directly from the wagon to a suitable receptacle, such as a crib, bin, or railway-car; and it consists of the combinations and arrangements of parts hereinafter particularly described, and pointed out in the appended claims.

In the drawings, Figure 1 is a perspective view of the combined wagon-dump and conveyer. Fig. 2 is a side elevation of the wagon-dump. Fig. 3 is a perspective view taken from another position from that seen in Fig. 1 and showing the wagon elevated to discharge its contents into the receiving-hopper and the clutch controlling the driving connection uncoupled. Fig. 4 is a perspective view of the receiving-hopper, one of the sides thereof being partially broken away. Fig. 5 is a transverse section of the receiving-hopper. Fig. 6 is a longitudinal section through the discharging end of the receiving-hopper, and Fig. 7 relates to a detail of the receiving-hopper.

Referring to the drawings, A indicates a wagon hoist or dump, B a conveyer or receiving-hopper into which the load of the wagon when the latter is tilted is discharged, and C an elevator for conveying the contents of the wagon from the receiving-hopper B to the bin or car designed to finally receive the same.

The wagon-dump is preferably so disposed and arranged that the wagon may be driven directly into position without leaving the ground or support on which the apparatus rests and is provided with means whereby when the wagon has been elevated and tilted to the desired degree the mechanism for elevating the wagon may be automatically thrown out of operation.

The wagon-hoist A comprises a suitable frame or support consisting of the side members or uprights 10, suitably spaced apart to permit of the wagon being driven between the same. In the construction illustrated the members 10 are connected at the upper ends by a cross-bar 11, and the bars forming the side members are suitably tied together and braced by strips 12. In order that the wagon-dump may be rendered portable and readily moved from place to place, the side members 10 are preferably mounted on runners 13. Journaled in suitable bearing-plates 14, secured to one of the side members 10, is a shaft or drum 15, driven in the manner hereinafter explained. Connected to and adapted to be wound about the drum 15 is a rope or cable 16, which passes upwardly and over a sheave 17, journaled on the cross-bar 11. This rope then passes around a block 18 on the cross-bar 11 and a block 19 of the usual block-and-tackle order or which may be of any preferred character. Suspended from the block 19 is a suitable device for engaging the front end of the wagon to elevate the latter, so as to tilt the wagon into such position that the contents thereof will slide therefrom into the receiving-hopper B. Such device in the present instance consists of a cross-bar 20, provided with loops 21, adapted to receive the hubs of the front wheels of the wagon, as shown in Fig. 3. These loops 21 may be of rope or wire attached to the ends of the bar 20. The shaft or drum is provided with a gear 22, with which meshes a pinion 23, fixed upon a shaft 24, journaled in the bearing-plate 14. Loosely mounted on the shaft 24 and adapted to slide longitudinally thereof is a sprocket-wheel 25, with which coöperates a chain 26, meshing with a sprocket-wheel 27, fixed upon a shaft 28, journaled near the lower end of the frame, as shown. The shaft 28 receives motion from a suitable source, as hereinafter explained. Fixed on the shaft 24 is a clutch member 29, adapted to coöperate with a clutch member 30, rigid with the loose sprocket 25. The hub of the sprocket-wheel 25 is provided with an annular groove, as clearly shown in Fig. 2, into which projects the upper end of a lever 31, pivoted, as at 32, on the frame. Connecting with the lever 31 is a rod 33, the end of which extends, as shown in Fig. 1, adjacent to the far side of the receiving-hopper B, so as to be within convenient reach of the attendant stationed at this point to watch the operation of the machine and see that the load is not discharged too rapidly to be handled by the conveyer. Fixed on the shaft 24 is a ratchet-wheel 34, with which coöperates a dog 35, pivoted to the adjacent bearing-plate 14.

It is apparent from the foregoing that when power is applied to the shaft 28, the loops 21 being hitched around the front hubs of the wagon, as shown in Fig. 3, and the clutch coupled by means of the rod 33, the bar 20 will, through the medium of the gearing described, be elevated, thereby raising the front end of the wagon with it. The clutch may be manually coupled and uncoupled by means of the rod 33. The clutch is also automatically uncoupled when the wagon has reached the desired point of elevation. This may be accomplished by means of a suitable connection between the wagon-dumping means and the lever 31 and now to be described. Suitably mounted on the frame is a slide-rod 36, the lower end of which is connected to an angular arm 37 of the lever 31, such lever being in the form of a bell-crank lever, as clearly shown in Fig. 2. The upper end of the rod 36 is connected by a flexible connection, such as a chain 38, to the cross-bar 20. It is obvious that when the cross-bar 20 is raised from the position of Fig. 1 to that shown in Fig. 3 the rod 36 will be moved upwardly, thereby rocking the lever 31 on its pivot and uncoupling the clutch, as shown in Fig. 3. The point at which the wagon is arrested automatically will of course depend upon the length of the chain 38, and this chain is of such length as to cause the arrest of the movement when the wagon has been tilted to the angle necessary to properly discharge the load, the wagon being held in that position by reason of the engagement of the dog 35 with the ratchet-wheel 34. The wagon may, however, be arrested at any desired point by means of the manually-operated rod 33. To lower the wagon, the dog 35 is disengaged from the ratchet-wheel 34, and the descent of the wagon may be governed as it descends by gravity by means of a hand-wheel 39, fixed on the shaft 24.

The wagon when tilted discharges into a receiving-hopper B. In the embodiment of the invention illustrated this hopper B consists of an elongated body provided in its bottom with a suitable conveyer, consisting in the present instance of flights or slats 40, attached at their ends to chains 41, running on sprocket-wheels 42, one pair of such wheels being secured on a shaft 43, journaled at one end of the hopper, as shown in Figs. 3 and 4, while the other pair, one of which is seen in Fig. 6, is fixed on the shaft 44, passing through the side walls of the hopper and suitably journaled in upwardly-extending bearing-plates 45, fixed to the sides of the boot of the elevator C. The shaft 44 provides a pivot for the receiving-hopper, so that the latter may be swung upwardly into the position shown in dotted lines in Fig. 1 and out of the path of the wagon as the latter is drawn between the side members 10 of the frame of the wagon-dump. The flights on the upper stretch of the hopper-conveyer travel over the bottom 46 of the hopper, and the latter, as well as the conveyer, as shown in Figs. 3 and 6, is deflected upwardly at the end adjacent the elevator C, so that the conveyer will discharge into the boot of the elevator, each chain 41 being held in its deflected position by means of a guide-plate 47, secured to the side of the hopper, as shown in Fig. 4. Motion is communicated to the shaft 44 by means of a chain 48 passing over a sprocket-wheel 49, fixed on said shaft, and meshing with a sprocket-wheel 50 on the usual shaft located in the boot of the elevator.

One side, 51, of the receiving-hopper B, as shown in Figs. 4 and 5, is inclined upwardly and outwardly to provide a receiving-shelf for the grain discharged from the wagon and to guide the same into the hopper, the other side, 52, of the hopper being straight and of suitable height to prevent the grain spilling over at that side. In order to permit of the load being discharged into the receiving-hopper B from either side of the same, so that the said hopper may be placed at either end of the wagon-dump, we preferably provide the same with removable sides so constructed and arranged that they may be interchanged. To this end the side 51, as well as the side 52, is provided with cleats 53, adapted to be removably seated in sockets provided by straps 54, secured to the opposite sides of the hopper, as shown in Figs. 4 and 5.

Extending laterally of the hopper-body, from each side thereof, is a pair of angular wings 55, each pair being spaced apart substantially the length of the removable sides. These wings are adapted to coöperate with the inclined side 51 to close the space between the ends of the inclined side and the hopper to prevent the grain spilling over the ends of the receiving-board. Each wing 55 is provided with an inwardly-extending flange 56, taking the form of a strip secured to the under edge of each wing. The inclined receiving-board when in position at either side of the hopper rests upon the flanges of the wings at that side of the hopper and is thereby properly supported in position. Secured to the inner face of each of the wings 55 are stops 57. When the side 52 is slipped into position at either side of the hopper, the stops 57 engage the outer face of the same and assist the sockets to hold it in position to resist the pressure of the grain when dumped into the hopper. The outer end of the hopper B may be provided with an inclined deflecting-board 58, designed to direct the grain forwardly and prevent the same spilling out at the aperture between the rear end and the bottom of the hopper, through which the conveyer passes.

As shown in Fig. 6, the discharge end of the hopper may be provided with a deflector designed to prevent the grain dropping down between the slats of the conveyer when the latter leave the bottom 46 and turn from their straight-line course around the sprockets 42 and also to prevent the grain being whipped back by the slats. In the present embodiment of the invention this deflector consists of an extension of the hopper-bottom and takes the form of a plate 59, seated in a recess in the bottom 46 below the usual sheathing 60. The forward end of the plate 59 extends beyond the shaft 44 and is carried partially around the same concentrically therewith. By means of this arrangement an extension of the hopper-bottom is provided past the shaft 44, and as the flights pass over and in contact with this plate the grain is projected by centrifugal action forwardly and is prevented from being whipped back by the flights or dropping down between the same. The curved portion of the plate is cut back to accommodate the sprocket 42, the body of the plate being the width of the bottom 46. The conveyer of the receiving-hopper in the construction illustrated discharges into the boot of the elevator C, designed to deliver the grain or other material into a bin, crib, car, or other receptacle. This elevator may be of any preferred character and supported at the desired angle and in the desired position by means of a suitable frame 61, provided with the usual tackle for adjusting the angle or inclination of the elevator.

The receiving-hopper B is preferably provided with a handle 62 to facilitate the raising and lowering of the same, and a counterbalance 63 may also be employed and attached to a cable 64, running over a sheave 65 (shown in dotted lines in Fig. 1) and attached to the handle 62. In the present instance the elevator-shaft is driven by a shaft 66, operated from any suitable source of power, and motion is communicated from the elevator-shaft to the shaft 28 by a connecting-shaft 67. The shafts 66 and 67 may be in the form of tumbling-rods adapted to be connected with the elevator-shaft and the shaft 28 by couplings 68, each end of the said shafts being provided with such coupling. By this arrangement the dumping apparatus and the conveyers of the receiving-hopper and elevator may be driven from the same source of power irrespective of the relative positions of the dumping apparatus and the receiving-hopper, and the receiving-hopper may therefore be located at either end of the dumping apparatus, as conditions necessitate, the couplings 68 affording ready means for connecting up the shaft 28 and elevator-shaft with the source of power.

In the use of the apparatus the receiving-hopper B is raised into its elevated position, as shown in dotted lines in Fig. 1, out of the way of the wagon, and the latter is then drawn between the side members 10 and the team unhitched, the receiving-hopper being lowered into position at the rear of the wagon. The cross-bar 20 being in its lowered position, the loops 21 are passed between the spokes of the front wheels of the wagon and engaged with the hubs of such wheels, as shown in Fig. 3, the rear wheels being preferably blocked. The clutch is then coupled by means of the rod 33, thereby throwing the gears into operation and raising the cross-bar 20, which, by reason of its connection with the hubs of the front wheels of the wagon, tilts the wagon on its rear axle and into the position shown in Fig. 3. As soon as the wagon has been tilted or elevated far enough to move the rod 36 the lever 31 is rocked on its pivot, uncoupling the clutch, as shown in Fig. 3, the wagon being held in elevated position by reason of the engagement of the dog with the ratchet-wheel 34. The tail-board of the wagon having been removed, the contents thereof slide downwardly into the receiving-hopper B and are carried by the conveyer in such hopper to the boot of the elevator C, to be carried by the usual conveyer 69 of the latter to the bin or car. After the wagon is unloaded the dog 35 is then released, permitting the wagon-body to lower to the ground, such movement being retarded by the hand-wheel 39.

Having described our invention, what we claim is—

1. In an apparatus of the class described, the combination with an upright frame, a hoisting-bar provided with wheel-engaging loops, a drum on the frame, a cable on the drum connected with the hoisting-bar, clutch-controlled means mounted on the frame for driving the drum, and a flexible connection between the bar and the clutch.

2. In an apparatus of the class described, the combination with a vertically-movable wagon-support, a drum, and a cable operated by the drum to elevate the support, of a clutch, a clutch-operating lever, a rod attached to the lever, and a flexible connection between the support and the rod.

3. In an apparatus of the class described, the combination with a hoisting-bar, loops connected to the bar and adapted to receive the hubs of opposite wheels of a wagon, and means for elevating the bar, of a clutch controlling such means, and a flexible connection actuated by the movement of the bar to uncouple the clutch.

4. In an apparatus of the class described, the combination with a hoisting-bar provided with means for connection with a wagon, of a drum, a cable connected to the drum and the hoisting-bar, clutch-controlled mechanism for driving the drum, a lever for coupling and uncoupling the clutch, a rod connected to the lever, a flexible connection between the bar and the rod, and means for holding the hoisting-bar in its elevated position.

5. In an apparatus of the class described, the combination with a hoisting-bar, loops connected to the bar and adapted to receive the hubs of the front wheels of a wagon, of a drum, a gear on the drum, a shaft having a pinion meshing with the gear, a ratchet-wheel on the shaft and a dog coöperating with the ratchet-wheel, a wheel loose on the shaft, coöperating clutch members for securing the wheel to the shaft, means for driving the wheel, a lever for throwing the clutch member into and out of engagement, a rod connected to the lever, and a flexible connection between the rod and the hoisting-bar.

6. A receiving-hopper provided with a conveyer and having interchangeable sides one of which is inclined outwardly.

7. A receiving-hopper provided with a conveyer and having wings extending outwardly from the sides at each end thereof, and interchangeable sides one of which is inclined upwardly and outwardly and adapted to coöperate with the wings at either side of the hopper.

8. A receiving-hopper provided with a conveyer and having wings extending outwardly from the sides at each end thereof, supporting-flanges on the wings and interchangeable sides one of which is inclined upwardly and outwardly and adapted to coöperate with the wings at either side of the hopper and rest upon the flanges of the said wings.

9. In an apparatus of the class described, the combination with a wagon-dump, of an elevator, and a swinging receiving-hopper provided with a conveyer and adapted to be swung into position at the end of a wagon to receive the contents therefrom and convey the same to the elevator, the sides of the hopper being interchangeable and one of them being inclined.

10. In an apparatus of the class described, the combination with a wagon-dump, of an elevator, a receiving-hopper pivotally mounted on the elevator and normally located at the end of the wagon-dump and having a conveyer for delivering the contents of a wagon from the receiving-hopper to the elevator, the said hopper being adapted to be moved upwardly out of the way as the wagon passes to the dump and then to be swung downwardly to receive the contents of the wagon and the sides thereof being interchangeable and one of them being inclined outwardly.

11. In an apparatus of the class described, the combination with a wagon-dump, of a receiving-hopper provided with a conveyer and adapted to receive the contents of the wagon, the said hopper having interchangeable sides one of which sides is provided with an inclined shelf.

12. In an apparatus of the class described, the combination with a wagon-dump, of an elevator, and a receiving-hopper for receiving the contents of the tilted wagon and having a conveyer for discharging such contents to the elevator, the said hopper being located at the rear of the dumping-wagon and having interchangeable sides one of which is provided with an inclined receiving-shelf whereby the dump may be so located as to permit the wagon to dump into the receiving-hopper at either side.

13. In an apparatus of the class described, the combination with a device to be attached to a wagon to dump the same, of a drum, a cable connected to the said device and adapted to be wound on the drum, means for driving the drum, a clutch controlled by the movement of the said device for throwing the driving means out of operation, an elevator, a receiving-hopper pivoted on the elevator and provided with a conveyer for conducting the contents of the wagon to the elevator, the said hopper having interchangeable sides one of which is inclined outwardly, and connections for driving the drum and the receiving-hopper and elevator-conveyers.

14. In an apparatus of the class described, the combination with a wagon-dump and a receiving-hopper therefor, having a conveyer and adapted to be located at either end of the wagon-dump, of interchangeable driving connections for communicating motion to the wagon-dump and hopper-conveyer from the same source of power irrespective of the relative locations of the wagon-dump and hopper.

15. In an apparatus of the class described, the combination with a wagon-dump, and a receiving-hopper therefor, having a conveyer and adapted to be located at either end of the wagon-dump, an elevator, means for transmitting motion from the elevator to the hopper-conveyer, driving connections, and couplings for connecting the driving connections, whereby the elevator and the wagon-dump may be driven from the same source of power irrespective of the relative locations of the wagon-dump and hopper.

16. In an apparatus of the class described, the combination with a wagon-dump, a frame therefor, a shaft journaled on the frame for communicating motion to the wagon-dump, an elevator provided with a conveyer and a shaft for driving the same, a receiving-hopper having a conveyer, and adapted to be located at either end of the wagon-dump, a chain for communicating motion from the elevator-shaft to the hopper-conveyer, driving connections, and couplings at each end of the wagon-dump and elevator-shafts for connecting the said shafts with the driving connections irrespective of the relative locations of the wagon-dump and the elevator and hopper.

17. In an apparatus of the class described, the combination with a wagon-dump, a frame therefor, a shaft journaled on the frame for communicating motion to the wagon-dump and provided with a shaft-coupling at each end, an elevator provided with a conveyer and having a shaft for driving the elevator, a shaft-coupling at each end of the elevator-shaft, shafts for communicating motion to the wagon-dump and elevator-shafts and adapted to be interchangeably connected thereto by the said couplings, a receiving-hopper pivoted on the boot of the elevator and having a conveyer and a driving connection between the elevator-shaft and the receiving-hopper conveyer.

18. In a device of the class described, the combination with a wagon-dump, and a receiving-hopper having a conveyer and adapted to be located at either end of the dump, a power-shaft adapted to operate the dump and hopper-conveyer, and means to connect the shaft with the dump and conveyer when the hopper is at either end of the dump.

19. In an apparatus of the class described, the combination with a hoisting-bar, of clutch-controlled means for elevating the bar, a clutch-lever, and a permanent connection between the bar and the lever.

In testimony whereof we affix our signatures in presence of two witnesses.

JOHN Q. ADAMS.
ALONZO T. ADAMS.

Witnesses:
CHARLES H. ADAMS,
W. V. ADAMS.